(12) United States Patent
Matmon et al.

(10) Patent No.: US 6,668,118 B2
(45) Date of Patent: Dec. 23, 2003

(54) CYLINDRICAL LENS ALIGNMENT METHOD

(75) Inventors: Guy Matmon, Jerusalem (IL); Eli Rafaeli, Neve Daniel (IL); Eyal Shekel, Jerusalem (IL)

(73) Assignee: Chiaro Networks Ltd., Jerusalem (IL)

( * ) Notice: Subject to any disclaimer, the term of this patent is extended or adjusted under 35 U.S.C. 154(b) by 118 days.

(21) Appl. No.: 10/061,657

(22) Filed: Feb. 1, 2002

(65) Prior Publication Data
US 2003/0147595 A1 Aug. 7, 2003

(51) Int. Cl.[7] .............................. G02B 6/26; G02B 6/42; G02B 6/32; G01B 11/00; G01B 11/26
(52) U.S. Cl. ............................. 385/52; 385/33; 385/34; 356/399; 356/154
(58) Field of Search .............................. 385/32, 34, 52, 385/115, 116, 119, 120; 356/154, 399; 250/208.1, 201.2, 201.4, 216

(56) References Cited
U.S. PATENT DOCUMENTS

| | | | | |
|---|---|---|---|---|
| 3,596,101 A | * | 7/1971 | Someya et al. ............. 250/204 |
| 3,882,462 A | * | 5/1975 | McMahon ................... 382/127 |
| 4,097,750 A | * | 6/1978 | Lewis et al. ................. 250/548 |
| 4,499,569 A | * | 2/1985 | Lopez De Romana ... 369/44.23 |
| 4,674,011 A | * | 6/1987 | Patton et al. ................ 362/553 |
| 5,095,386 A | * | 3/1992 | Scheibengraber ........... 359/668 |
| 5,255,115 A | * | 10/1993 | Kikuchi ....................... 359/209 |
| 6,477,293 B1 | * | 11/2002 | Golub .......................... 385/24 |

* cited by examiner

Primary Examiner—Edward J. Glick
Assistant Examiner—Thomas R Artman
(74) Attorney, Agent, or Firm—Ladas and Parry (57) ABSTRACT

A method for aligning an optical assembly, including the steps of emitting at least one beam from an emitter substantially along a first axis, disposing a cylindrical lens in said at least one beam to form at least one line image, wherein a longitudinal axis of said cylinder lens is substantially parallel to a second axis which is different from said first axis, displaying at least one vertical profile of said at least one line image, defocusing said at least one line image until a first peak and a second peak of said at least one profile are displayed and adjusting in a third axis which is different from said first axis and said second axis a position of said cylindrical lens relative to said emitter until said first peak and said second peak are symmetric.

29 Claims, 11 Drawing Sheets

CYLINDRICAL LENS ALIGNMENT METHOD

BACKGROUND OF THE INVENTION

1. Field of the Invention

This invention relates to alignment of optical devices. More particularly, this invention relates to a method, and the apparatus used therefor, for the axial alignment of the end face of an optical fiber or an array of optical fibers with a cylindrical lens and for evaluating the quality of the light that is emitted by the fiber or the array.

2. Description of the Related Art

In the past, the assembly and manufacture of optical assemblies having a linear array of optical elements has been time consuming and prone to quality control problems. The latest developments in optical cross-connect assemblies have only magnified these problems. Precisely engineered optical receiver arrays are required in these assemblies. A general demand for more precisely constructed assemblies having greater reliability has translated into a demand for better manufacturing apparatus and processes Optical devices of the type addressed by the present invention currently in use involve an array of optical fibers having light transmitted therethrough. In typical devices the light exiting the end faces of the fibers is scattered, and it is necessary to collect it using collimation lenses or focusing optics. The focusing optics may include a precisely aligned cylindrical lens.

In current devices, it is required to precisely position a light source, which can be an optical fiber, or an array of optical fibers with respect to a horizontally oriented cylindrical lens within tolerances of a few microns in the vertical axis. It would be desirable to evaluate the quality of light that is emitted by the source at the time the alignment is performed, since setup costs have already been incurred. This would avoid the cost of performing a separate quality control procedure.

SUMMARY OF THE INVENTION

It is therefore a primary object of some aspects of the present invention to provide an improved method for precisely aligning a cylindrical lens with a fiberoptic array.

It is another object of some aspects of the present invention to provide an improved method for the evaluation of a beam emitted by a light source in an optical assembly These and other objects of the present invention are attained by an optical arrangement in which the vertical alignment of an optical assembly is evaluated and adjusted. The assembly includes an array of emitters, such as an array of optical fibers, and a cylindrical lens. An optical stage or a vacuum chuck is used to adjust the vertical position of either the emitter or the cylindrical lens. Evaluation of alignment and beam quality is achieved using a defocused diffraction pattern produced by the cylindrical lens that is imaged onto the detector plane of a camera, and is captured by the camera. The output of the camera is linked to a display monitor, enabling qualitative evaluation of the image. A computer having a display monitor is also linked to the camera, using a frame grabber, and produces a plot of a vertical profile of the camera image The relative vertical position of the emitter and the cylindrical lens is then adjusted until the diffraction peaks seen on the computer monitor are symmetric and have the same amplitude. Using qualitative evaluation the source of defects can be differentiated by translating the cylindrical lens along its longitudinal axis.

The invention provides a method for aligning an optical assembly, including the steps of emitting a beam from an emitter, and disposing a cylindrical lens in the beam to form a diffraction pattern which is imaged onto the detector plane of a camera, wherein the longitudinal axis of the cylindrical lens is horizontally oriented. The method includes displaying a vertical profile of the line image, defocusing the line image until a first peak and a second peak of the profile are displayed, and adjusting the vertical position of the cylindrical lens relative to the emitter until the first peak and the second peak are symmetric.

In an aspect of the method, adjusting the vertical position is performed until the amplitude of the first peak is identical to the amplitude of the second peak.

According to a further aspect of the method, the line image is captured on a camera, which may be an infra-red camera.

In yet another aspect of the method, the profile is displayed by connecting a computer to the camera.

According to still another aspect of the method, the emitter includes a fiberoptic array.

One aspect of the method includes detecting an irregularity in the line image, horizontally displacing the cylindrical lens in a direction of its longitudinal axis, and determining a positional change of the irregularity.

According to an additional aspect of the method, the irregularity is detected by visual inspection.

According to one aspect of the method, the irregularity is detected by automatic computer implemented pattern recognition.

According to another aspect of the method, the beam includes a first beam that is emitted from a first element of the emitter, and a second beam that is emitted from a second element of the emitter. The line image includes a first line image that is projected by the first beam, and a second line image that is projected by the second beam The profile includes a first profile of the first line image and a second profile of the second line image. The method includes performing a θZ movement of the emitter relative to the cylindrical lens until the first peak and the second peak of the first profile, and the first peak and the second peak of the second profile are simultaneously symmetric.

According to an additional aspect of the method, the beam includes a first beam that is emitted from a first element of the emitter and a second beam that is emitted from a second element of the emitter. The line image includes a first line image that is projected by the first beam, and a second line image that is projected by the second beam. The profile includes a first profile of the first line image and a second profile of the second line image. The method includes adjusting the first line image to produce a predetermined pattern, performing a θY movement of the emitter relative to the cylindrical lens until the first line image and the second line image simultaneously have the predetermined pattern.

According to another aspect of the method, the predetermined pattern is a unimodal peak on the first profile and the second profile.

According to a further aspect of the method, the predetermined pattern is a multimodal peak on the first profile and the second profile.

The invention provides a method for aligning an array of optical fibers with a lens, including the steps of horizontally orienting a longitudinal axis of a cylindrical lens emitting a first beam from a first optical fiber of an optical fiber array, disposing the cylindrical lens in the first beam to form a first line image, displaying a first vertical profile of the first line image, defocusing the first line image until a first peak and a second peak of the first vertical profile are displayed, and adjusting a vertical position of the cylindrical lens relative to the optical fiber array until the first peak and the second peak are symmetric.

According to an aspect of the method, adjusting the vertical position is performed until the amplitude of the first peak is identical to the amplitude of the second peak.

According to one aspect of the method, the first line image is captured on a camera, which may be an infra-red camera According to a further aspect of the method, the first vertical profile is displayed by connecting a computer to the camera.

Yet another aspect of the method includes detecting an irregularity in the first line image, horizontally displacing the cylindrical lens in a direction of the longitudinal axis, and determining a positional change of the irregularity.

According to yet another aspect of the method, the irregularity is detected by visual inspection.

According to still another aspect of the method, the irregularity is detected by automatic computer implemented pattern recognition.

An additional aspect of the method includes emitting a second beam from a second optical fiber of the optical fiber array toward the cylindrical lens to form a second line image, and displaying a second vertical profile of the second line image. The method includes performing a θZ movement of the optical fiber array relative to the cylindrical lens until the cylindrical lens and the optical fiber array are rotationally aligned, such that the first peak and the second peak of the first vertical profile are symmetric, and the first peak and the second peak of the second vertical profile are symmetric.

According to another aspect of the method, the first optical fiber and the second optical fiber are alternately illuminated by a light source.

One aspect of the method includes adjusting the first line image to produce a predetermined pattern, emitting a second beam from a second optical fiber of the optical fiber array toward the cylindrical lens to form a second line image, displaying a second vertical profile of the second line image The method includes performing a θY movement of the optical fiber array relative to the cylindrical lens until the cylindrical lens and the optical fiber array are rotationally aligned, such that the first line image and the second line image have the predetermined pattern.

According to a further aspect of the method, the first optical fiber and the second optical fiber are alternately illuminated by a light source.

According to another aspect of the method, the predetermined pattern is a unimodal peak.

According to a further aspect of the method, the predetermined pattern is a multimodal peak.

BRIEF DESCRIPTION OF THE DRAWINGS

For a better understanding of these and other objects of the present invention, reference is made to the detailed description of the invention, by way of example, which is to be read in conjunction with the following drawings, wherein.

DESCRIPTION OF THE PREFERRED EMBODIMENT

In the following description, numerous specific details are set forth in order to provide a thorough understanding of the present invention. It will be apparent however, to one skilled in the art that the present invention may be practiced without these specific details.

In describing the embodiments herein, the following conventions are used. The Z-axis is nominally horizontal, and coincides with the optical axis of an optical element that is being manipulated. The X-axis refers to the horizontal axis that is orthogonal to the Z-axis The Y-axis is the vertical axis, and is orthogonal to both the X-axis and the Z-axis Rotation about the X-axis, Y-axis, and Z-axis is referred to as θX, θY and θZ motion or rotation respectively The terms θY and θZ adjustment refer to rotational movements of a first component relative to a second component about the Y-axis and Z-axis of the first component respectively. Of course, it is possible to use the method and apparatus disclosed herein in many positions and orientations, in which case the X-axis, Y-axis, and Z-axis are appropriately translated.

Optical Arrangement—General Description

Figure 1A:
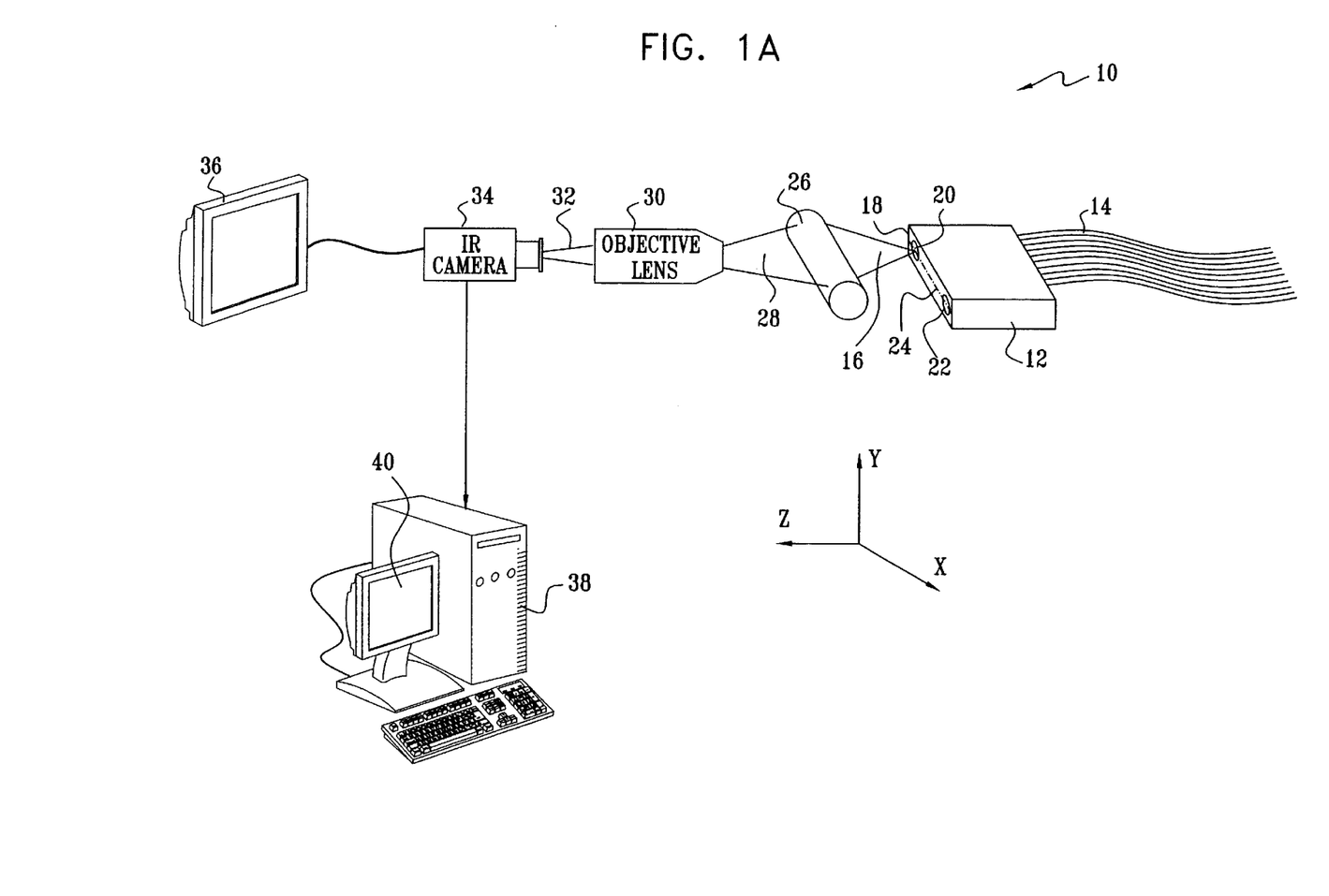
FIG. 1A schematically illustrates an optical arrangement for aligning optical devices constructed and operative in accordance with a preferred embodiment of the invention.

Turning now to the drawings, reference is made to FIG. 1A, which schematically illustrates an optical arrangement 10 that is constructed and operative in accordance with a preferred embodiment of the invention. The optical arrangement 10 comprises a fiberoptic array 12 having a plurality of optical fibers 14. Inlets of the optical fibers 14 are coupled to a radiation source, such as an infra-red laser (not shown) The optical fibers 14 output an infra-red beam 16 that is emitted through an exit plane 18, at where are located the outlets of the optical fibers 14. In a current application the cores of the optical fibers 14 each typically have a diameter of approximately 9 $\mu$m. The outputs of individual ones of the optical fibers 14 are referred herein to as sub-beams if they are combined into a single output beam.

In FIG. 1A, the beam 16 is typically emitted from the outlet of a marginal off-center optical fiber 20. However in some aspects of the operation of the apparatus shown in FIG. 1A, the beam 16 may be emitted from the outlet of another optical fiber of the fiberoptic array 12, such as a corresponding marginal off-center optical fiber 22. The outlets of the individual optical fibers 14 are linearly arranged and substantially parallel to a line 24, which is located in the exit plane 18 The beam 16 is directed toward a cylindrical lens 26, the longitudinal axis of which is substantially parallel with the exit plane 18 The cylindrical lens 26 emits a focused beam 28 towards an objective lens 30 The objective lens 30 receives a line image from the cylindrical lens 26, and focuses a beam 32 onto an infra-red camera 34. Suitable cameras are commercially available from Electrophysics Corp, 373 Route 46 West Fairfield, N.J. 07004-2442 The output of the camera 34 is connected to a display monitor 36 and to a computer 38, which can be a general purpose computer. The computer 38 is also provided with a display monitor 40 and executes frame grabber software.

In the presently preferred embodiment, the cylindrical lens 26 and the objective lens 30 and the other members of the optical arrangement shown in FIG. 1A are typically sensitive to radiation in the infra-red spectrum. However, it is appreciated that radiation in other spectral bands of the electromagnetic spectrum, such as the visible spectrum, may also be used. For such a case, the source of the radiation and the members of the optical arrangement of FIG. 1A, are sensitive to the particular radiation in use.

The display monitor 36 produces an analog representation of the image captured by the camera 34. The display monitor 40 presents the output of the computer 38, and it displays plots of the vertical profile of the image captured by the camera 34.

The fiberoptic array 12 is preferably fixed in position and the cylindrical lens 26 is mounted on a conventional optical stage (not shown), such as a vacuum chuck stage, having freedom of movement along the X-, Y-, and Z-axes, and being capable of theta-Y and theta-Z motion. The movements of the cylindrical lens 26 are thus relative to the fiberoptic array 12. It is also possible to manipulate the position of the fiberoptic array 12 relative to the cylindrical lens 26 by attaching the fiberoptic array 12 to a vacuum held chuck, and fixing the position of the cylindrical lens 26. The beam 16 that is emitted from the core of each of the optical fibers 14 is a Gaussian beam. The beam 16 diverges as it exits from the exit plane 18. The cylindrical lens 26 is placed at a distance from the exit plane 18, such that its vertical dimension corresponds to the vertical spread of the beam 16. The image profile in the vertical direction at the focus of the cylindrical lens 26 is a line image, the length of which is a function of the distance between the fiberoptic array 12 and the cylindrical lens 26.

The optical arrangement 10 is useful in accomplishing two objectives: (1) the accurate positioning of the cylindrical lens 26 with respect to the line 24; and (2) the qualitative evaluation of the individual sub-beams emitted by the optical fibers 14. In some embodiments, it is possible to qualitatively evaluate all the sub-beams collectively There are certain considerations in establishing the physical relationship between the outlets of the optical fibers 14 and the cylindrical lens 26, which are disclosed hereinbelow.

In placing the longitudinal axis of the cylindrical lens 26 substantially perpendicular to the optical axis of the optical fibers 14, the Z-axis, the optimum distance between the exit plane 18 and the cylindrical lens 26 depends both on the vertical dimension of the cylindrical lens 26 and the vertical spread of the beam 16. This distance affects the location on the Z-axis of the focused line image that is projected by the beam 28

The location of the cylindrical lens 26 along the X-axis is not critical, as variation in the horizontal direction does not cause any change in the direction of the beam 28.

The optical arrangement 10 is extremely sensitive to misalignment in the Y-axis between the cylindrical lens 26 and the exit plane 18. It is necessary to accurately align the longitudinal axis of the cylindrical lens 26 relative to the optical axes of the optical fibers 14, with a tolerance of only a few microns. This degree of accuracy is very difficult to achieve, mainly due to the fact that the distance between the cylindrical lens 26 and the exit plane 18 along the Z-axis is several orders of magnitude greater than the tolerance in the Y-axis.

Figure 1B:
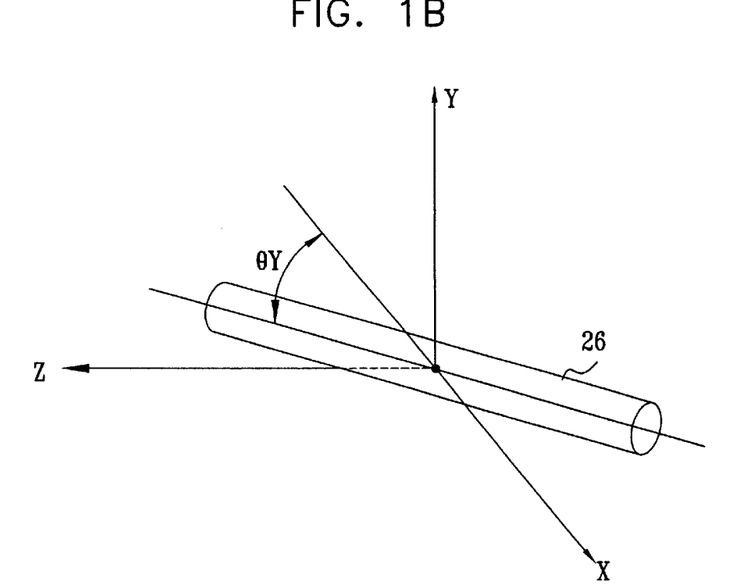
FIG. 1B is a simplified illustration of a rotation of the cylindrical lens of the optical arrangement of FIG. 1A about a Y-axis in accordance with a preferred embodiment of the invention.

A $\theta$Y adjustment, which is a rotation about the Y-axis in the X-Z plane, is generally necessary in order to align the longitudinal axis of the cylindrical lens 26 substantially parallel to the exit plane 18 (FIG. 1B).

Figure 1C:
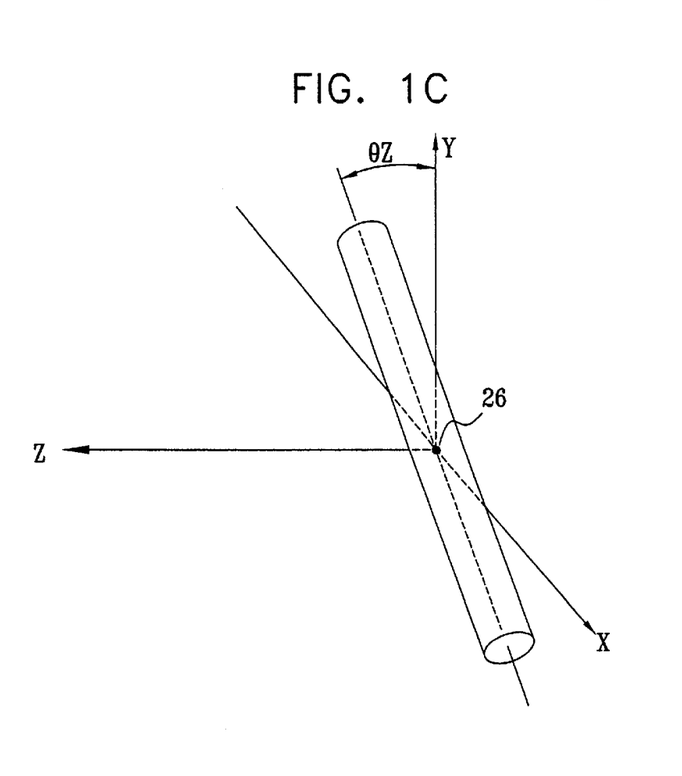
FIG. 1C is a simplified illustration of a rotation of the cylindrical lens of the optical arrangement of FIG. 1A about a Z-axis in accordance with a preferred embodiment of the invention.

A $\theta$Z adjustment, which is a rotation about the Z-axis in the X-Y plane, is generally necessary in order to align the longitudinal axis of the cylindrical lens 26 substantially parallel with the line 24 in the exit plane 18 (FIG. 1C)

Figure 2A:
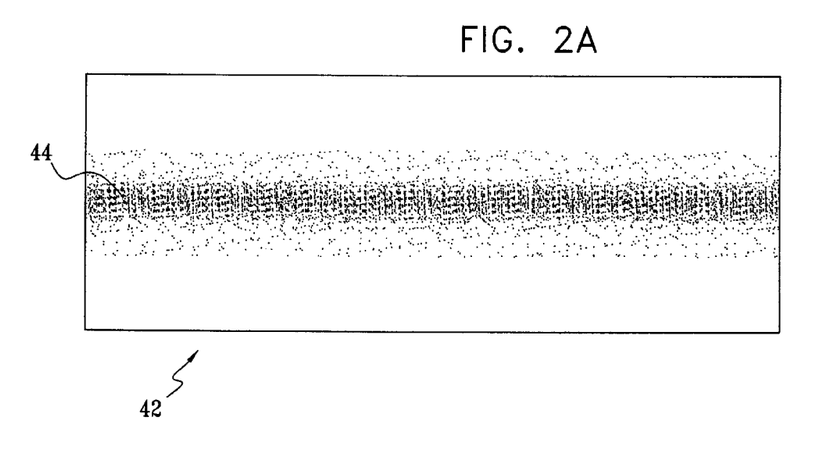
FIG. 2A and FIG. 2B show screen displays that are generated for the objective lens, which is located in the focal plane of the cylindrical lens of the optical arrangement of FIG. 1A in accordance with a preferred embodiment of the invention.
Figure 2B:
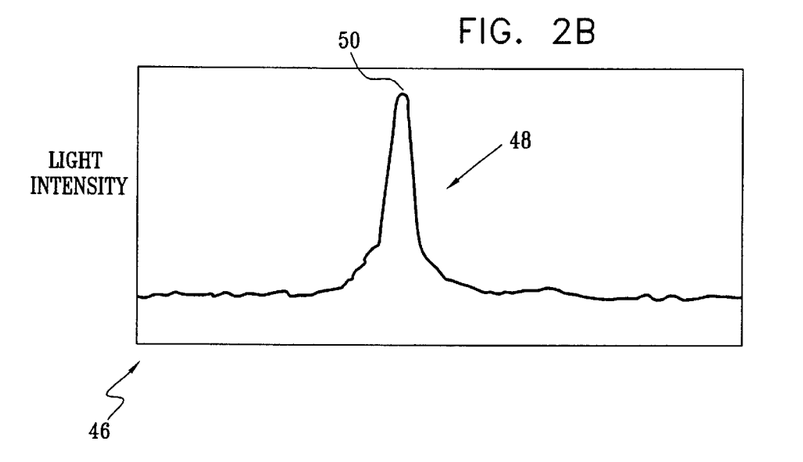

Reference is now made to FIGS. 2A and 2B, which illustrate screen presentations of the display monitor 36 and the display monitor 40, respectively. The description of FIGS. 2A and 2B is to be read in conjunction with FIG. 1A. The following discussion illustrates the role of the display monitor 36 and the display monitor 40 during alignment of the optical arrangement 10. When the objective lens 30 is optimally positioned at the focus of the cylindrical lens 26, the result is a line image which is seen on a screen display 42 of the display monitor 36 as a distribution of image lines 44 (FIG. 2A) The typical width of an optimally focused line image is only a few microns, depending on the quality of the cylindrical lens 26. A screen display 46 of the display monitor 40 displays the line image as an intensity distribution 48, having a single peak 50 (FIG. 2B).

Figure 3A:
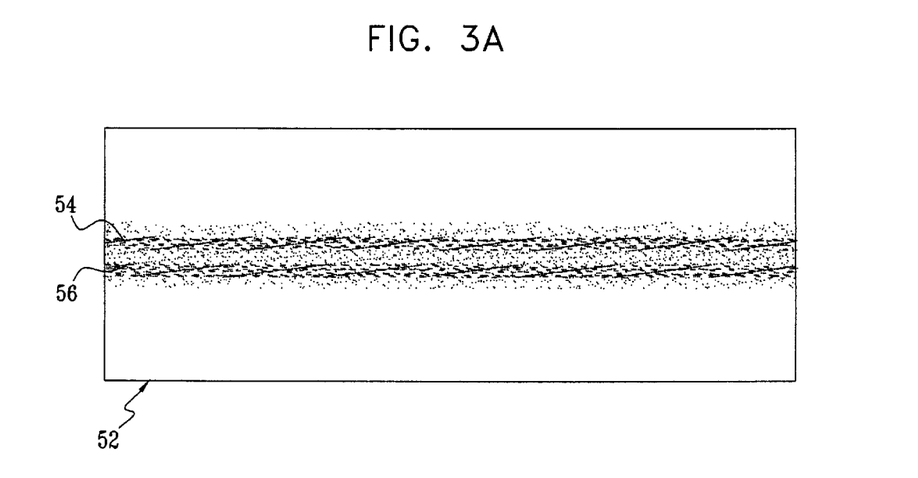
FIG. 3A and FIG. 3B show screen displays that are generated for the objective lens, which is located between the focal plane of the cylindrical lens and the objective lens of the optical arrangement of FIG. 1A in accordance with a preferred embodiment of the invention.
Figure 3B:
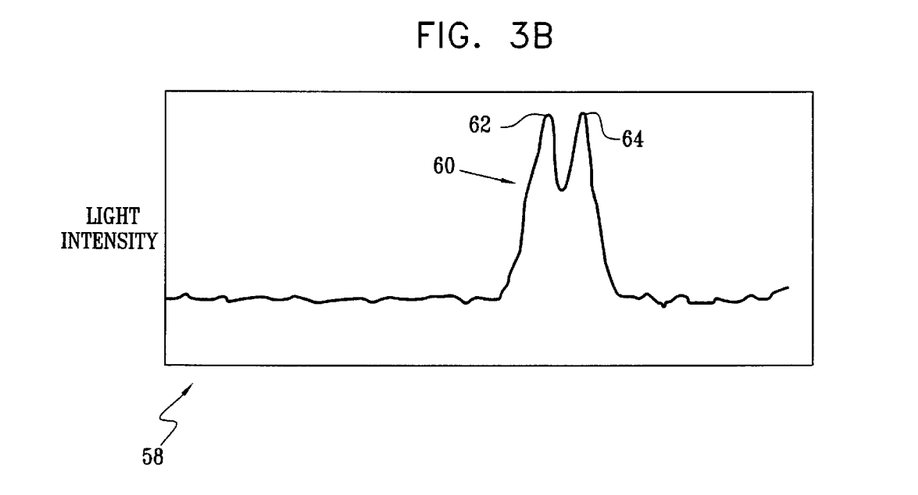

Reference is now made to FIGS. 3A and 3B, which illustrate screen presentations of the display monitor 36 and the display monitor 40, respectively. The description of FIGS. 3A and 3B is to be read in conjunction with FIG. 1A. As shown in a screen display 52, which appears on the display monitor 36, shifting the objective lens 30 slightly toward the cylindrical lens 26 results in loss of focus, and the occurrence of a diffraction pattern produced by the cylindrical lens 26 that is imaged onto the detector plane of the camera 34. The screen display 52 (FIG. 3A) shows the splitting of the line image into two lines 54, 56. A corresponding screen display 58 (FIG. 3B), which appears on the display monitor 40, shows an intensity distribution 60, having two peaks 62, 64.

Figure 4A:
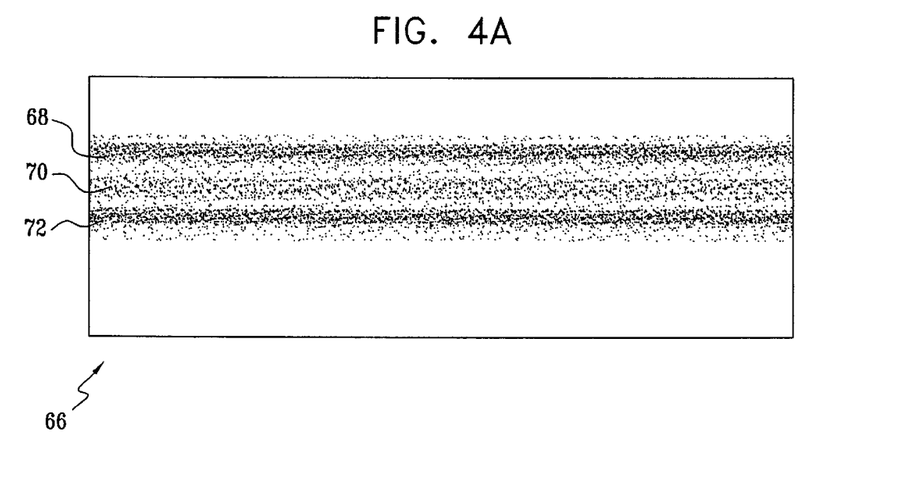
FIG. 4A and FIG. 4B show screen displays that are generated for the objective lens, which is located farther from the focal plane of the cylindrical lens than for the objective lens location of FIG. 2, in accordance with a preferred embodiment of the invention.
Figure 4B:
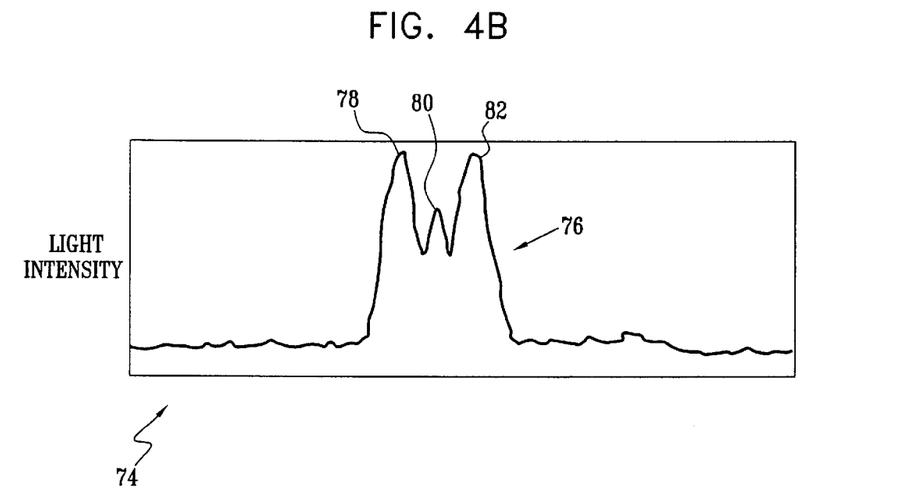

Reference is now made to FIGS. 4A and 4B, which illustrate screen presentations of the display monitor 36 and the display monitor 40, respectively The description of FIGS. 4A and 4B is to be read in conjunction with FIG. 1A. FIGS. 4A and 4B show the effect of shifting the objective lens 30 toward the cylindrical lens 26, so that the line image produced by the cylindrical lens 26 is further defocused than for the case shown in FIGS. 3A and 3B As shown on a screen display 66 (FIG. 4A), which appears on the display monitor 36, there are now three lines 68, 70, 72. It is seen that the intermediate line 70 is less prominent than the lines 68, 72. On a screen display 74 (FIG. 4B), which appears on the display monitor 40, an intensity distribution 76 features three peaks 78, 80, 82, of which the middle peak 80 is smaller than the peaks 78, 82. In some cases, depending on the geometry of the various components in the optical arrangement 10, the three peaks 78, 80, 82 may be nearly equal in amplitude.

If the objective lens 30 is shifted even closer to the cylindrical lens 26, then four, five, or even a larger number of lines appear on the display monitor 36 and a corresponding number of peaks can be resolved on the display monitor 40.

Figure 5:
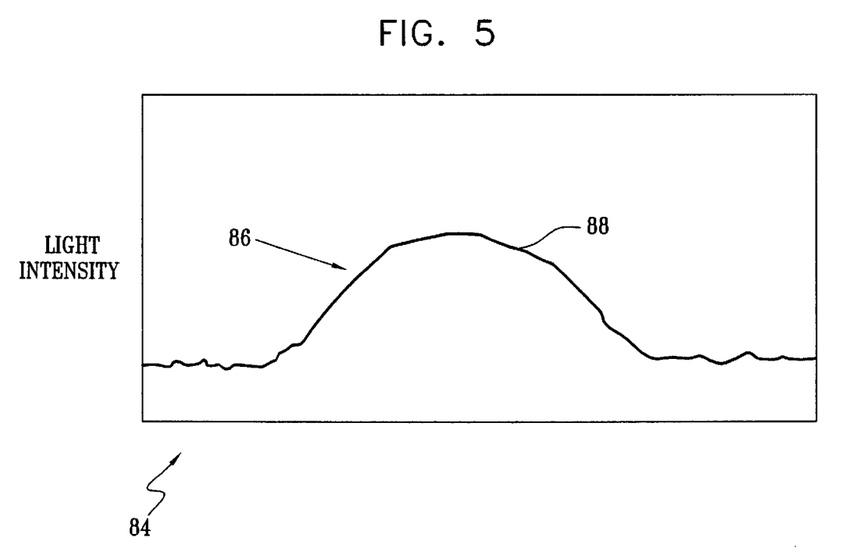
FIG. 5 illustrates a screen display that is generated for the objective lens, which is shifted from the cylindrical lens and beyond its line of focus, in accordance with a preferred embodiment of the invention.

Reference is now made to FIG. 5, which illustrates a screen presentation of the display monitor 40. The description of FIG. 5 should be read in conjunction with FIG. 1A and FIGS. 2A and 2B. The objective lens 30 is now shifted in a direction away from the cylindrical lens 26, beyond its line of focus. This results in spreading of the displayed peak On a screen display 84, which appears on the display monitor 40, an intensity distribution 86 features a single peak 88, which is relatively broad, when compared with the appearance of the peak 50 on the screen display 46 (FIG. 2B).

Thus it is possible to determine the position of the objective lens 30 relative to the line of focus of the cylindrical lens 26 by inspection of the display monitor 40

Vertical Alignment

Figure 6:
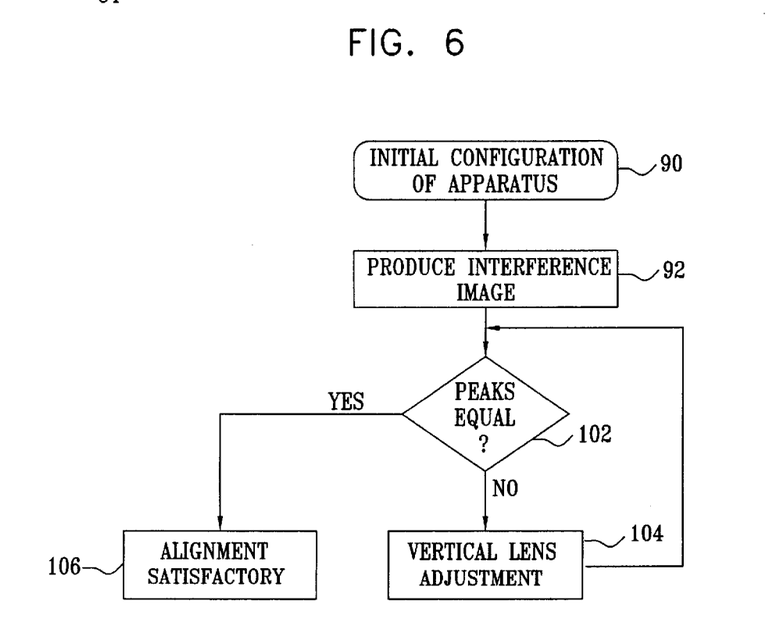
FIG. 6 is a flow chart of an alignment procedure that is operative in accordance with a preferred embodiment of the invention.

Reference is now made to FIG. 6, which is a flow chart for performing a vertical alignment of the fiberoptic array 12, using the optical arrangement 10, which is operative in accordance with a preferred embodiment of the invention. The description of FIG. 6 is to be read in conjunction with FIG. 1A. The optical arrangement 10 is initially configured at initial step 90, during which the cylindrical lens 26 is placed in an approximate location in front of the exit plane 18. At least one of the optical fibers 14, for example the optical fiber 20, as shown in FIG. 1A, is connected to the laser source or another similar suitable radiation source (not shown). The positions of the objective lens 30 and the camera 34 are adjusted, so that the image at the focus of the cylindrical lens 26 is visible on the display monitor 36, and a plot appears on the display monitor 40

Next, at step 92, the position of the objective lens 30 is adjusted in the Z-axis relative to the cylindrical lens 26 to produce a diffraction pattern that is imaged onto the detector plane of the camera 34, and displayed on the display monitor 40 similar to the screen display 58 (FIG. 3B). The peaks of the screen display 58 are symmetrical only if there is no misalignment in the Y-axis between the longitudinal axis of the cylindrical lens 26 and the optical axis of the optical fiber 20.

Figure 7:
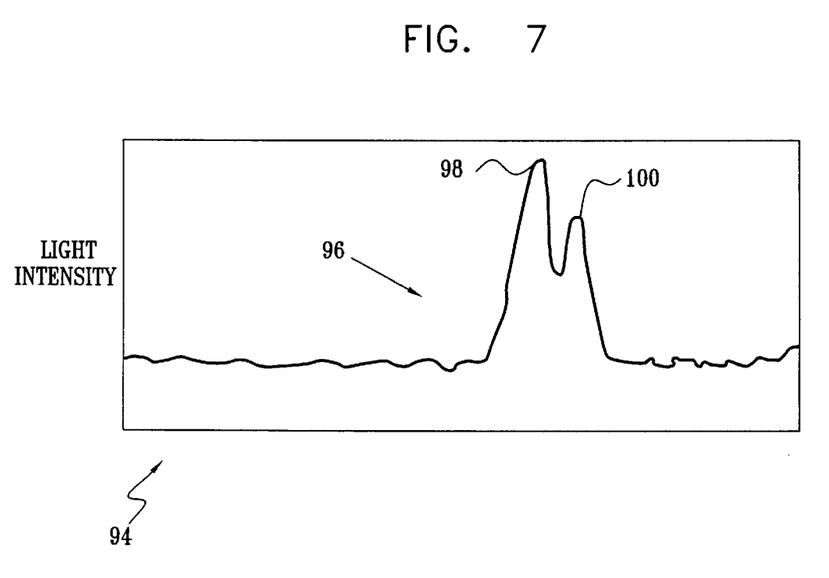
FIG. 7 shows a screen display that is generated by the arrangement shown in FIG. 1A in accordance with a preferred embodiment of the invention.

Reference is now made to FIG. 7, which illustrates a screen display of the display monitor 40. The description of FIG. 7 is to be read in conjunction with FIG. 1A, FIGS. 4A and 4B and FIG. 6. A screen display 94 features an intensity distribution 96, having two resolved peaks 98, 100. The amplitude of the peak 98 is greater than that of the peak 100. The presence of two peaks indicates that the projected image is defocused, as explained above. The difference in the amplitudes of the peak 98 and the peak 100 indicates that the cylindrical lens 26 is not properly aligned in the Y-axis with respect to the exit plane 18

Referring again to FIGS. 3A and 3B, FIG. 6, and FIG. 7, at decision step 102 an evaluation of the screen display on the display monitor 40 is made to determine if the peaks have the same amplitude. If the peaks 98, 100 are different in amplitude, then at step 104, a vertical adjustment of the objective lens 30 relative to the cylindrical lens 26 is performed. Control then returns to decision step 102. If the vertical adjustment is performed in the wrong direction, then the difference in amplitude of the peaks increases in the next iteration, and appropriate correction in subsequent iterations must be made Generally, as the vertical adjustment approaches an optimum, the symmetry of the peaks also improves, so that they appear as shown in FIG. 3B.

If the peaks displayed on the display monitor 40 are determined to have the same amplitude at decision step 102, then it may be concluded that the cylindrical lens 26 and the objective lens 30 are in proper alignment in the Y-axis and the procedure terminates at final step 106.

θZ Adjustment

Figure 8:
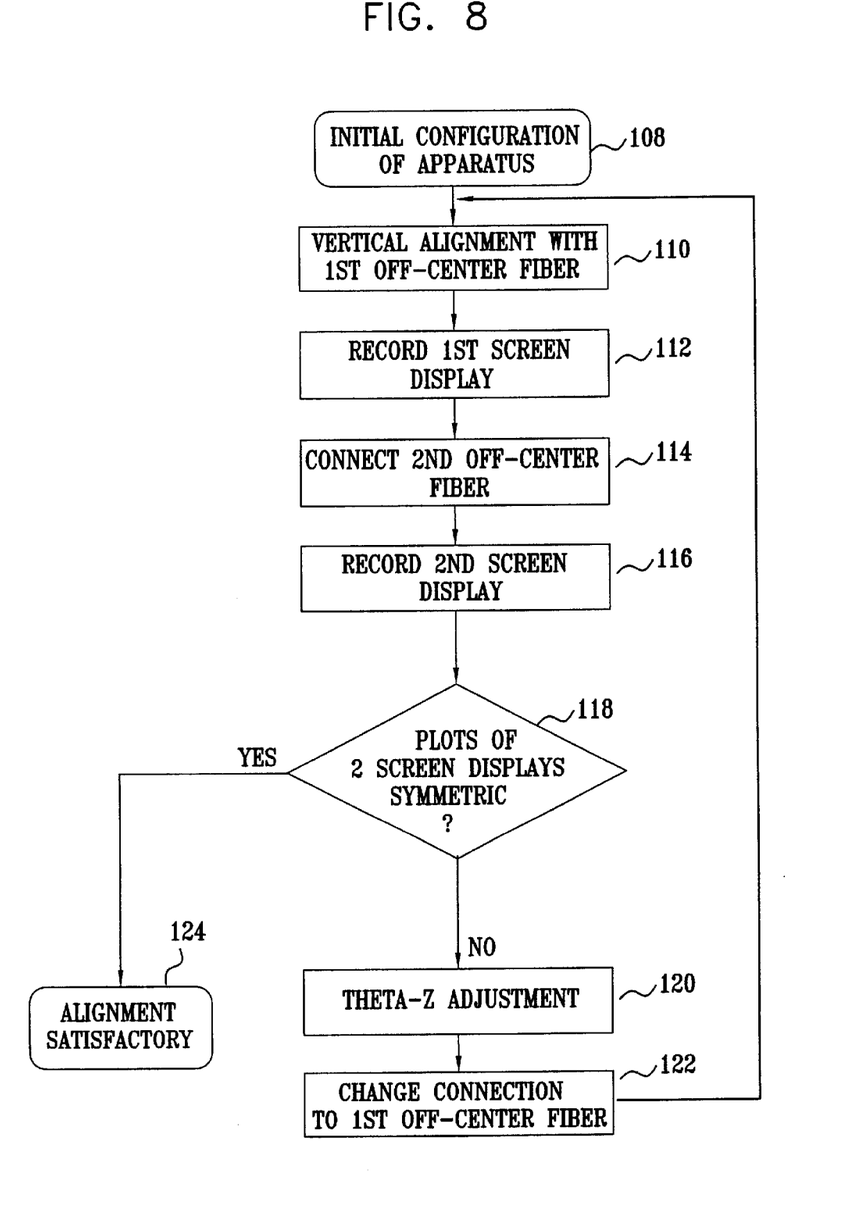
FIG. 8 is a flow chart illustrating the process of θZ adjustment of a fiberoptic array in accordance with a preferred embodiment of the invention.

Reference is now made to FIG. 8, which is a flow chart illustrating the process of θZ adjustment of the fiberoptic array 12 in accordance with a preferred embodiment of the invention The description of FIG. 8 should be read in conjunction with FIG. 1A, FIG. 6, and FIG. 7. θZ adjustment is accomplished using an iterative cycle, in which the procedure shown in FIG. 8, is performed using the off-center element 20 of the optical fibers 14. A similar screen display is also produced for the corresponding off-center element 22. Following each iteration, a θZ adjustment is made by executing a θZ motion of the cylindrical lens 26 relative to the fiberoptic array 12, and the results compared with the previous cycle. As the θZ alignment approaches an optimum, the peaks 98, 100 (FIG. 7) on the display monitor 40 (FIG. 1A) produced by the optical fiber 20 during a first measurement, and the peaks 98, 100 on the display monitor 40 produced by the optical fiber 22 during a second measurement in the same iteration all become symmetrical. In the event that the θZ motion was performed in the wrong direction, appropriate feedback is obtained at the conclusion of the following iteration, and the direction can then be reversed.

At initial step 108 the configuration of the apparatus, which was previously accomplished in initial step 90 (FIG. 6), is confirmed and adjusted if necessary, connecting the optical fiber 20 to the light source (not shown). At step 110, a vertical alignment is performed as detailed in FIG. 8. The appearance of the peaks 98, 100 (FIG. 7) on the display monitor 40 (FIG. 1A) during a first measurement is recorded in step 112 At step 114, the optical fiber 20 is disconnected from the light source (not shown) and the optical fiber 22 connected to the light source. Alternatively, the optical fibers 20, 22 may each be connected to different light sources, which are enabled and disabled individually In step 116 the appearance of the peaks 98, 100 (FIG. 7) on the display monitor 40 during a second measurement is recorded. At decision step 118, the records made in step 112 and step 116 are compared. The appearance of the peaks 98, 100 obtained in step 112, should be symmetric as a result of the Y-axis alignment of step 110, as is explained with reference to the detailed description of FIG. 6. The record prepared in step 112 is also kept for documentation and quality control. In practice, it is sufficient in decision step 118 to assume that the peaks 98, 100 obtained in step 112 are symmetric, and to evaluate only the measurement that was obtained in step 116

If, at decision step 118, the peaks 98, 100 that were recorded in step 116 are determined not to be symmetric, then a θZ adjustment of the cylindrical lens 26 relative to the fiberoptic array 12 is made at step 120. Then, at step 122 the optical fiber 22 is disconnected from the light source (not shown), and the optical fiber 20 is reconnected to the light source. Control then returns to step 110. Otherwise, θZ alignment is considered to be satisfactory, and the procedure terminates at final step 124.

θY Adjustment.

Figure 9:
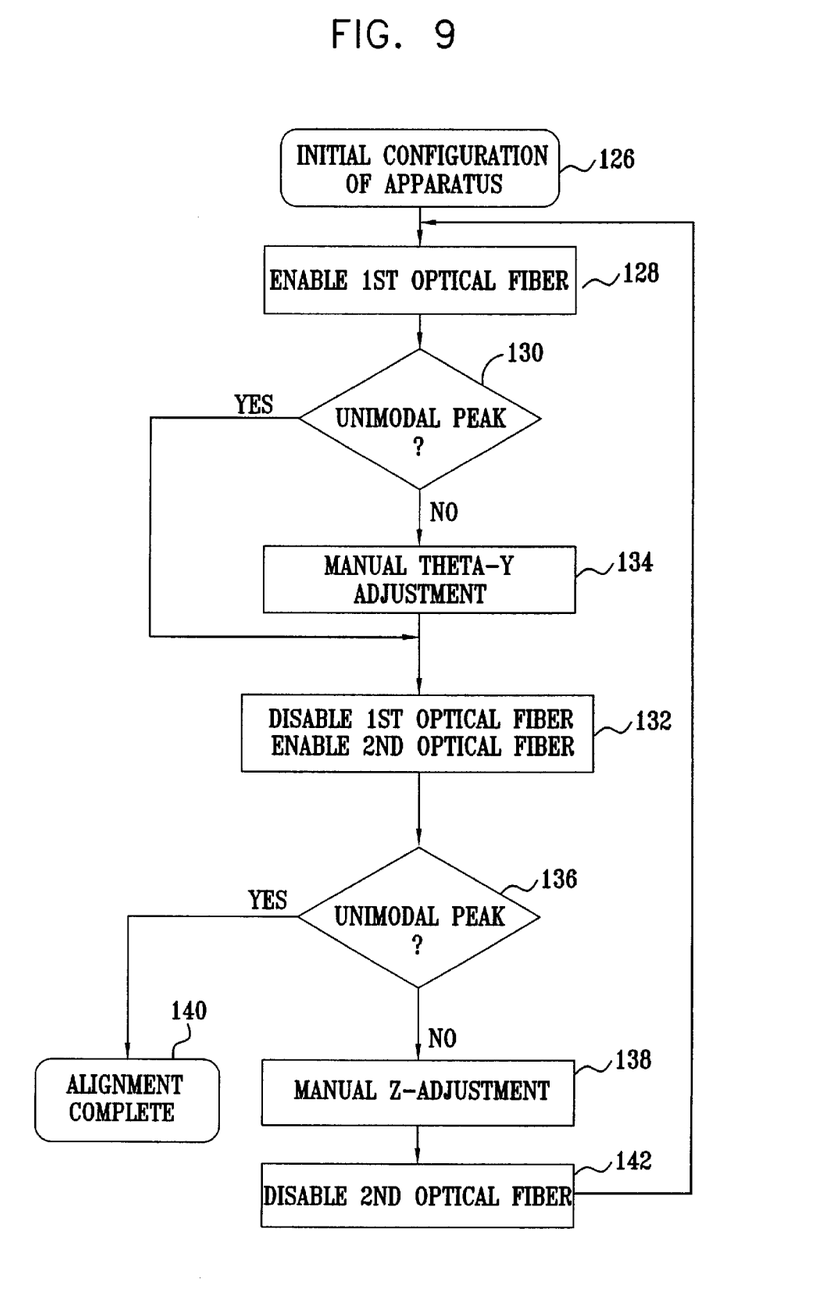
FIG. 9 is a flow chart illustrating the process of θY adjustment of a fiberoptic array in accordance with a preferred embodiment of the invention.

The optimum location of the cylindrical lens 26 in the Z-axis relative to the fiberoptic array 12 depends on the position of the focus of the cylindrical lens 26. The θY adjustment is not critical, and therefore can be accomplished manually, using the optical fiber 20 and the optical fiber 22 as alternate emitters. The general approach is as follows. The cylindrical lens 26 is rotated until a position is found at which a unimodal peak is seen on the display monitor 40 (FIG. 1A), when the optical fiber 20 and the optical fiber 22 are alternately connected to the light source. The location of the cylindrical lens 26 in the Z-axis is adjusted by the operator as necessary, taking care to hold the Y-location of the cylindrical lens 26 in its position of alignment as previously determined Reference is now made to FIG. 9, which illustrates a manual method of θY correction in accordance with a preferred embodiment of the invention. At initial step 126 the configuration of the apparatus, which was previously accomplished in initial step 90 (FIG. 6), is confirmed and adjusted if necessary. At step 128, the optical fiber 20 is enabled by connecting it to the light source (not shown). At decision step 130 the display monitor 40 is inspected to determine if a bimodal or a unimodal peak is present If the determination at decision step 130 indicates a unimodal peak then control proceeds to step 132.

If the determination at decision step 130 indicates that a bimodal peak is present then control proceeds to step 134. The operator manually performs a θY movement of the cylindrical lens 26 by an amount, which he estimates will correct half of the erroneous pattern. This adjustment is empirical, as well as application specific. Then, at step 132, the operator disables the optical fiber 20 by disconnecting it from the light source (not shown), and enables the optical fiber 22 using the same or a different light source (not shown) Enabling and disabling the optical fibers 20, 22 can be accomplished mechanically or electrically by conventional means.

At decision step 136, the display monitor 40 is again inspected and a determination is again made whether a bimodal or a unimodal peak is present. If the adjustment in step 134 was properly made, particularly in the first iteration, there will generally still be a bimodal peak on the display monitor 40. If the determination at decision step 136 indicates a bimodal peak exists, then control proceeds to step 138.

However, in the event that the determination at decision step 136 indicates that a unimodal peak exists, the θY alignment may be considered to be within acceptable tolerance Control proceeds to final step 140 and the procedure terminates.

At step 138 the operator adjusts the position of the cylindrical lens 26 in the Z-axis until a unimodal peak appears on the display monitor 40. Generally, some degree of θY misalignment will remain following completion of step 138, particularly on the first iteration of the method. At step 142 the optical fiber 22 is disconnected from the light source (not shown), and control returns to step 128.

Figure 10:
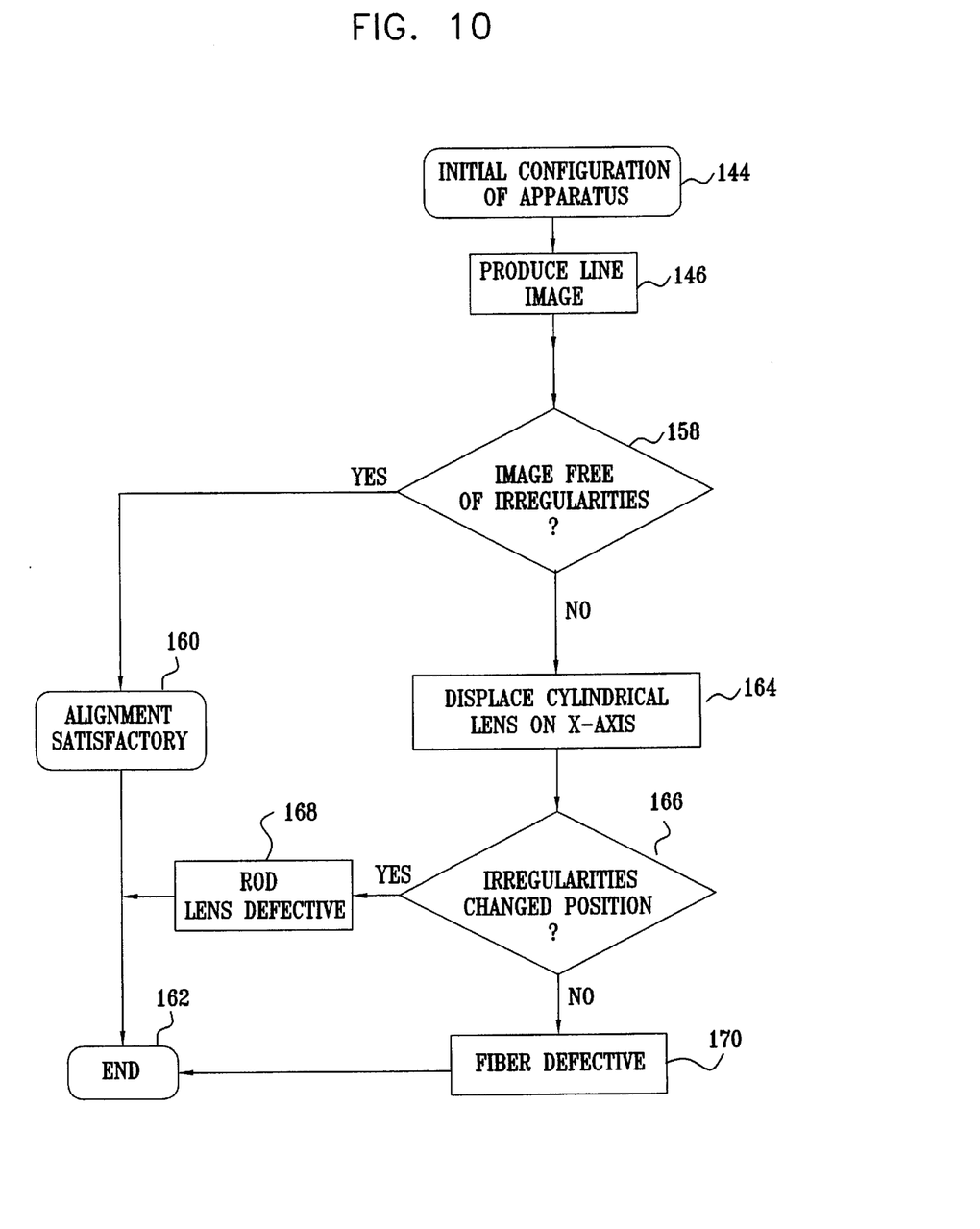
FIG. 10 is a flow chart of a procedure for detecting defects in components of the optical arrangement shown in FIG. 1A in accordance with a preferred embodiment of the invention.

While a unimodal peak is the preferred indicator on the display monitor 40 in the performance of the θY adjustment, it is possible to defocus the line image and use another well-defined pattern, such as a bimodal peak, so long as the appearance is identical when the optical fiber 20 and the optical fiber 22 are used as the alternate emitters Qualitative Evaluation of Optical Fibers and Cylindrical Lens Reference is now made to FIG. 10, which illustrates a method for qualitative evaluation of one or more optical fibers of the fiberoptic array 12 and the cylindrical lens 26. The description of FIG. 10 should be read in conjunction with FIG. 1A and FIGS. 3A and 3B. Preferably, the optics are carefully cleaned, as dirt on the cylindrical lens 26 may result in an unsatisfactory evaluation of the optical arrangement 10. The method may be conveniently performed during the alignment process, as the equipment is appropriately configured at that time. The optical arrangement 10 is initially configured at initial step 144, during which the cylindrical lens 26 is placed in a location in front of the exit plane 18, as described hereinabove. At least one of the optical fibers 14 of the fiberoptic array 12 is connected to the laser light source or similar suitable radiation source (not shown) The objective lens 30 and the camera 34 are adjusted, so that the image at the focus of the cylindrical lens 26 is visible on the display monitor 36, and a plot appears on the display monitor 40 (FIG. 1A).

Next, at step 146, the position of the objective lens 30 is adjusted relative to the cylindrical lens 26 to produce a diffraction pattern that is imaged onto the detector plane of the camera 34, and displayed on the display monitor 36 similar to the screen display 52 (FIG. 3A). It is now possible to analyze the quality and uniformity of the light that is emitted from the fiberoptic array 12. If the optical fibers 14 being evaluated are also undistorted and the cylindrical lens 26 has no defects, the lines 54, 56 (FIG. 3A) are uniform, and free of distortion throughout their length, as evaluated qualitatively by the operator.

Figure 11:
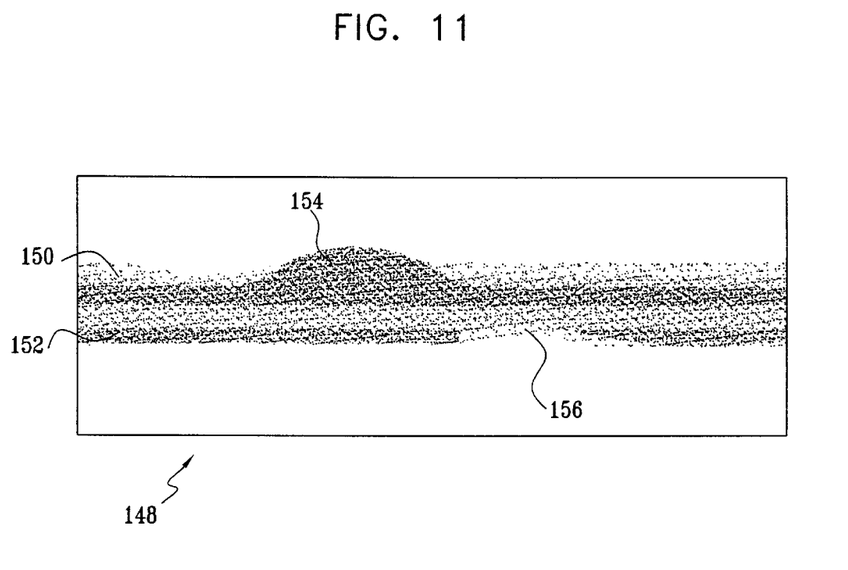
FIG. 11 shows a screen display that is generated by the arrangement shown in FIG. 1A, which is used to evaluate the quality of the components in the optical arrangement shown in FIG. 1A in accordance with a preferred embodiment of the invention.

Reference is now made to FIG. 11, which illustrates a screen display of the display monitor 36 The description of FIG. 11 is to be read in conjunction with FIG. 1A, FIGS. 3A and 3B, and FIG. 10. A screen display 148 displays two lines 150, 152, which are similar to the lines 54, 56 (FIG. 3A). However, rather than being smooth and regular, the lines 150, 152 display irregular areas 154, 156.

Referring again to FIG. 10, at decision step 158a qualitative evaluation of the lines displayed on the display monitor 36 is made. In the currently preferred embodiment of the invention, this evaluation is made by a human operator. It is also possible, using automatic computer implemented pattern recognition methods known to the art, to automate the evaluation of decision step 158 using a suitable program in the computer 38.

If at decision step 158, the display monitor 36 displays that the lines 150, 152 are regular and qualitatively smooth, substantially as shown in FIG. 3A, then at step 160 it is concluded that the quality of the optical arrangement 10 is satisfactory. The procedure terminates at step 162.

However, if at decision step 158, the display monitor 36 displays that the lines 150 and 152 show irregularities, such as the areas 154, 156 of the lines 150, 152 (FIG. 11), respectively, it may be concluded that a defect exists in at least one component of the optical arrangement 10. Control then proceeds to step 164 and the cylindrical lens 26 is displaced along the X-axis. As explained above, the optical arrangement 10 is insensitive to misalignment of the cylindrical lens 26 and the optical fibers 14 in the X-axis. However, if the cylindrical lens 26 itself is dirty, or has another optical defect, displacement of the cylindrical lens 26 on the X-axis results in a corresponding horizontal translation of the irregular areas on the display monitor 36.

At decision step 166, a determination is made whether the irregularities noted at decision step 158 have changed in position. If so, then at step 168 it is concluded that the cylindrical lens 26 is defective and procedure proceeds to final step 162.

However, if at decision step 166, it is determined that the irregularities noted at decision step 158 have not changed in position, then at step 170 it is concluded that the beam 16 emitted from the fiber is distorted and that at least one of the optical fibers 14 is distorted or otherwise defective The procedure terminates at step 162.

Additionally or alternatively, computer implemented pattern recognition methods known to the art may be applied in step 146 to evaluate the image presented on the display monitor 36 to produce quantitative data. In this case, the decision step 158 is performed utilizing the quantitative measurements obtained in step 146.

It will be appreciated by persons skilled in the art that the present invention is not limited by what has been particularly shown and described hereinabove. Rather the scope of the present invention includes both combinations and sub-combinations of the features described hereinabove as well as modifications and variations thereof which would occur to a person of skill in the art upon reading the foregoing description and which are not in the prior art.

What is claimed is:

1. A method for aligning an optical assembly, comprising the steps of:
    emitting at least one beam from an emitter substantially along a first axis;
    disposing a cylindrical lens in said at least one beam to form at least one line image, wherein a longitudinal axis of said cylinder lens is substantially parallel to a second axis which is different from said first axis;
    displaying at least one vertical profile of said at least one line image;
    defocusing said at least one line image until a first peak and a second peak of said at least one profile are displayed; and
    adjusting in a third axis which is different from said first axis and said second axis a position of said cylindrical lens relative to said emitter until said first peak and said second peak are symmetric.

2. The method according to claim 1, wherein said first axis, said second axis, and said third axis are substantially mutually orthogonal.

3. The method according to claim 1, wherein said step of adjusting is performed until an amplitude of said first peak is identical to an amplitude of said second peak.

4. The method according to claim 1, wherein said at least one line image is captured on a camera.

5. The method according to claim 4, wherein said camera is an infra-red camera.

6. The method according to claim 4, wherein said step of displaying said at least one profile is performed by connecting a computer to said camera.

7. The method according to claim 1, wherein said emitter comprises a fiberoptic array.

8. The method according to claim 7, further comprising the steps of:
    detecting an irregularity in said at least one line image;
    displacing said cylindrical lens substantially parallel to said second axis; and
    determining a positional change of said irregularity.

9. The method according to claim 8, wherein said irregularity is detected by visual inspection.

10. The method according to claim 8, wherein said irregularity is detected by automatic computer implemented pattern recognition.

11. The method according to claim 1, wherein said step of emitting at least one beam comprises emitting a first beam from a first element of said emitter and a second beam from a second element of said emitter;
    said at least one line image comprises a first line image that is projected by said first beam, and a second line image that is projected by said second beam; and
    said at least one profile comprises a first profile of said first line image and a second profile of said second line image;
    said method further comprising the step of:
    rotating said cylindrical lens about said first axis until said first peak and said second peak of said first profile and said first peak and said second peak of said second profile are simultaneously symmetric.

12. The method according to claim 1, wherein said step of emitting at least one beam comprises a first beam from a first element of said emitter and a second beam from a second element of said emitter;
    said at least one line image comprises a first line image that is projected by said first beam, and a second line image that is projected by said second beam; and
    said at least one profile comprises a first profile of said first line image and a second profile of said second line image;
    said method further comprising the steps of:
    adjusting said first line image to produce a predetermined pattern; and
    performing a rotation about said third axis of said emitter relative to said cylindrical lens until said first line image and said second line image simultaneously have said predetermined pattern.

13. The method according to claim 12, wherein said predetermined pattern is a unimodal peak on said first profile and said second profile.

14. The method according to claim 12, wherein said predetermined pattern is a multimodal peak on said first profile and said second profile.

15. A method for aligning an array of optical fibers with a lens, comprising the steps of:
    emitting a beam from a first optical fiber of an optical fiber array generally along a first axis
    orienting a longitudinal axis of a cylindrical lens substantially parallel to a second axis which is different from said first axis;

disposing said cylindrical lens in said beam to form a first line image;

displaying a first profile of said first line image;

defocusing said first line image until a first peak and a second peak of said first profile are displayed; and adjusting a position of said cylindrical lens along a third axis which is different from said first axis and said second axis relative to said optical fiber array until said first peak and said second peak are symmetric.

16. The method according to claim 15, wherein said first axis, said second axis, and said third axis are substantially mutually orthogonal.

17. The method according to claim 15, wherein said step of adjusting said position is performed until an amplitude of said first peak is identical to an amplitude of said second peak.

18. The method according to claim 15, wherein said first line image is captured on a camera.

19. The method according to claim 18, wherein said camera is an infra-red camera.

20. The method according to claim 18, wherein said step of displaying said first profile is performed by connecting a computer to said camera.

21. The method according to claim 15, further comprising the steps of:

detecting an irregularity in said first line image;

displacing said cylindrical lens in a direction of said longitudinal axis; and determining a positional change of said irregularity.

22. The method according to claim 21, wherein said irregularity is detected by visual inspection.

23. The method according to claim 21, wherein said irregularity is detected by automatic computer implemented pattern recognition.

24. The method according to claim 15, further comprising the steps of:

emitting a second beam from a second optical fiber of said optical fiber array toward said cylindrical lens to form a second line image;

displaying a second profile of said second line image;

rotating said optical fiber array relative to said cylindrical lens about said first axis until said cylindrical lens and said optical fiber array are rotationally aligned such that said first peak and said second peak of said first profile are symmetric and said first peak and said second peak of said second profile are symmetric.

25. The method according to claim 24, wherein said first optical fiber and said second optical fiber are alternately illuminated by a light source.

26. The method according to claim 15, further comprising the steps of:

adjusting said first line image to produce a predetermined pattern;

emitting a second beam from a second optical fiber of said optical fiber array toward said cylindrical lens to form a second line image;

displaying a second profile of said second line image; and rotating said optical fiber array relative to said cylindrical lens about said third axis until said cylindrical lens and said optical fiber array are rotationally aligned such that said first line image and said second line image have said predetermined pattern.

27. The method according to claim 26, wherein said first optical fiber and said second optical fiber are alternately illuminated by a light source.

28. The method according to claim 26, wherein said predetermined pattern is a unimodal peak.

29. The method according to claim 26, wherein said predetermined pattern is a multimodal peak.

* * * * *